US007557807B2

(12) United States Patent
Chen et al.

(10) Patent No.: US 7,557,807 B2
(45) Date of Patent: Jul. 7, 2009

(54) VISUAL SIMULATION OF WEATHERING BY Y-TON TRACING

(75) Inventors: Yanyun Chen, Beijing (CN); Xin Tong, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 11/174,439

(22) Filed: Jul. 1, 2005

(65) Prior Publication Data

US 2007/0002056 A1 Jan. 4, 2007

(51) Int. Cl.
*G06T 15/70* (2006.01)
(52) U.S. Cl. ..................................... 345/473
(58) Field of Classification Search .................. 345/473
See application file for complete search history.

(56) References Cited

U.S. PATENT DOCUMENTS 5,261,041 A * 11/1993 Susman ...................... 345/473
2003/0083854 A1 * 5/2003 Cronin ........................... 703/2

OTHER PUBLICATIONS

Alex Pang and Kyle Smith, Spray Rendering: Visualization Using Smart Particles, Oct. 25-29, 1993, Visualization, 1993, Visualization '93, Proceedings., IEEE Conference on, pp. 283-290 and CP-30.*
Alex Pang, Spray Rendering, Sep. 1994, Computer Graphics and Applications, IEEE, pp. 57-63.*
Alex Pang and Kyle Smith, Spray Rendering: A New Framework for Visualization, Jan. 1993, CiteSeer, UCSC-CRL-93-01, pp. 1-17.*
Alex Pang and Craig M. Wittenbrink, Spray Rendering as a Modular Visualization Environment, May 1995, ACM SIGGRAPH Computer Graphics, vol. 29, Issue 2, pp. 33-36.*
Eric Paquette, Pierre Poulin, George Drettakis; Surface Aging by Impacts, 2001, Proceedings of Graphics Interface 2001, pp. 1-8.*
Julie Dorsey, Hans Køhling Pedersen, Pat Hanrahan; Flow and Changes in Appearance; 1996; International Conference on Computer Graphics and Interactive Techniques, Proceedings of the 23rd annual conference on Computer Graphics and interactive techniques; pp. 411-420.*
Yanyun Chen, Lin Xia, Tien-Tsin Wong, Xin Tong, Hujun Bao, Baining Guo, Heung-Yeung Shum; Visual Simulation of Weathering by y-ton Tracing; Jul. 2005; ACM Transactions on Graphics (TOG), Proceedings of ACM SIGGRAPH 2005, Session: Appearance & illumination, vol. 24, Issue 3, pp. 1127-1133.*
S. Merillou and D. Ghazanfarpour, A survey of aging and weathering phenomena in computer graphics, Available online Jan. 18, 2008, Computers & Graphics, vol. 32, Issue 2, Apr. 2008, pp. 159-174.*
Michael Schwärzler, Rendering Imperfections: Dust, Scratches, Aging, . . . , 2007, Vienna University of Technology, Austria, pp. 1-13.*
Index of course related to Rendering Imperfections: Dust, Scratches, Aging, . . . . article http://www.cg.tuwien.ac.at/courses/Seminar/WS2007/, p. 1.*

* cited by examiner

*Primary Examiner*—Jeffery A Brier
(74) *Attorney, Agent, or Firm*—Lee & Hayes, PLLC

(57) ABSTRACT

An exemplary computer-implementable method includes providing a computer-generated object wherein the object has characteristics, emitting a computer-generated particle, determining if the particle interacts with the object and, if the particle interacts with the object, altering one or more of the characteristic of the object wherein the altering simulates weathering or aging of the object. Various other exemplary techniques are also disclosed.

19 Claims, 14 Drawing Sheets

EXEMPLARY SIMULATION OF WEATHERING

Exemplary Image 400

EXEMPLARY MAP 410

EXEMPLARY METHODS 900

EXEMPLARY RENDERING 1000

EXEMPLARY METHOD 1100

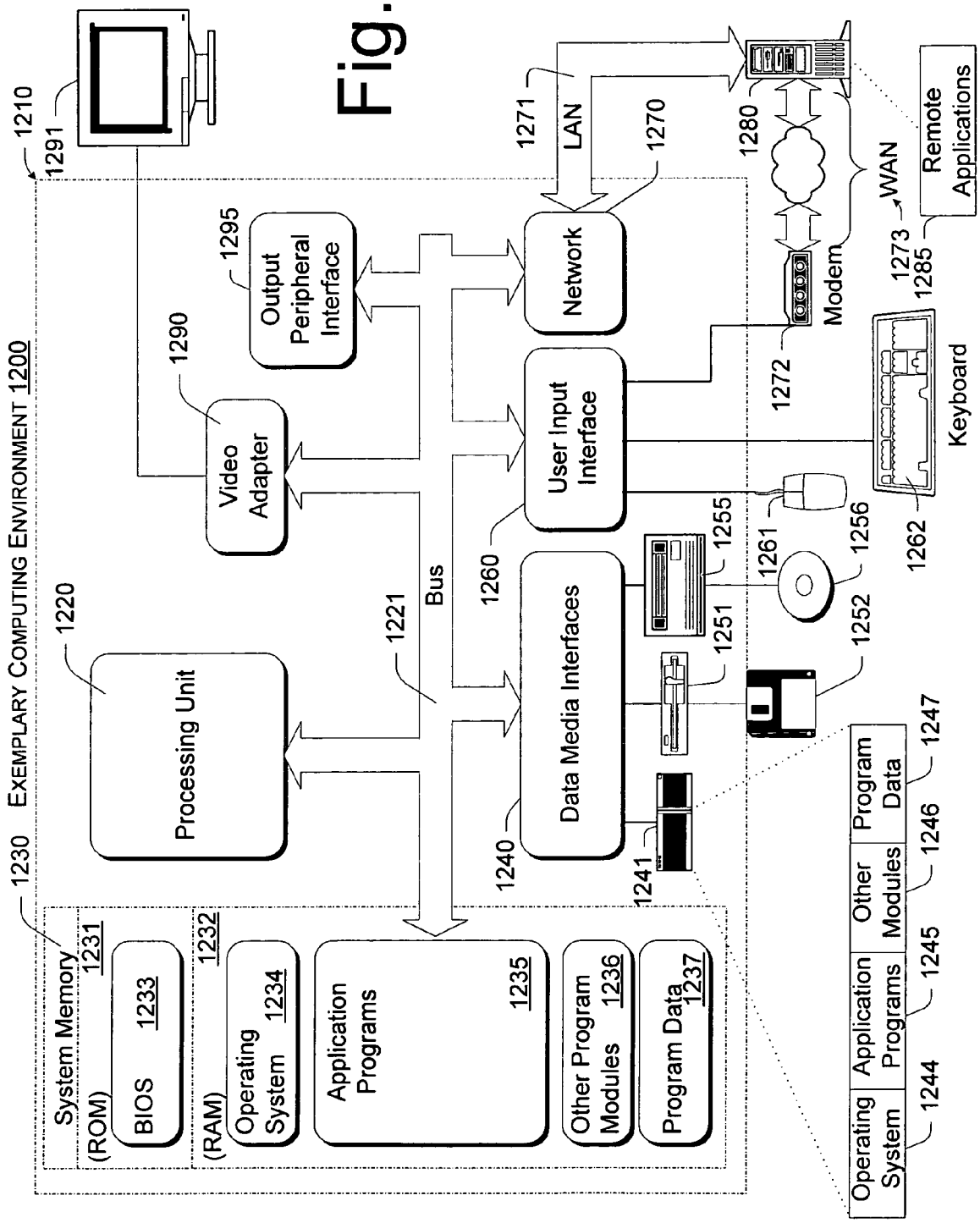

VISUAL SIMULATION OF WEATHERING BY γ-TON TRACING

BACKGROUND

Weathering modeling can introduce blemishes such as dirt, rust, cracks and scratches to virtual scenery. It is an important visual cue in photorealism as weathering effects appear everywhere in our daily life. Traditionally, blemishes are generated by combining many hand-painted textures. Such a process is labor intensive, especially if a weathering sequence has to be painted by hand and the consistency between consecutive frames is maintained manually. While some physically-based techniques can automatically simulate a number of aging effects, a drawback exists in that a new model has to be developed for each specific effect in conjunction with a detailed understanding of the underlying physical process. In addition, sometimes a physically-based simulation is not possible because the aging process (physical, chemical, biological, and combinations thereof) is not fully understood or too complex to simulate. Thus, a need exists for better techniques to simulate weathering or aging. Various exemplary techniques disclosed herein aim to satisfy this need or other needs.

SUMMARY

Exemplary techniques allow for weathering or aging of a scene or an object in a scene. Such techniques can also be used to achieve other effects. According to an example, a particle enters a scene and behaves according to one or more motion probabilities. The motion of the particle may lead to an interaction with an object in the scene whereby one or more carrier attributes associated with the particle may be used to alter characteristics of an object such as the objects surface's properties. Material properties and reflectance parameters may also play a role in altering an object's characteristic(s). For example, a particle may impact a surface in a scene, cause an affect to the surface and then reflect off the surface at a lesser energy to impact another surface. Various exemplary techniques are described herein with applicability to a variety of problems in scene rendering.

BRIEF DESCRIPTION OF THE DRAWINGS

Non-limiting and non-exhaustive examples are described with reference to the following figures, wherein like reference numerals generally refer to like parts throughout the various views unless otherwise specified.

FIG. 9A shows an original scene, FIG. 9B shows an example of multiple weathering effects simulated by exemplary γ-ton techniques and where FIG. 9C and FIG. 9D show single weather effects simulated by γ-ton tracing.

FIG. 12 is a diagram of an exemplary computing environment, which may be used to implement various exemplary technologies described herein.

DETAILED DESCRIPTION

As described herein, various exemplary visual simulation techniques rely on an exemplary γ-ton tracing method to simulate a wide variety of weathering phenomena. The term "γ-ton" is taken from the Greek word "γερος" or "γηραιος", which means "old". The suffix "ton" refers to the particle-like behavior of an exemplary γ-ton (e.g., consider photon, proton, etc.). Exemplary γ-ton tracing involves providing a scene and tracing a particle in the scene (e.g., from a source to an object in the scene) and then performing an action related to the tracing such that scene is, or can, be transformed (e.g., rendered). For example, such an exemplary simulation technique may be used to simulate moss growing on a sidewalk, dirt accumulating on the surface of a car, rust forming in a sink, deterioration of the surface of a statue, etc.

While a single particle or γ-ton may be used, in general, modeling a weathering effect with γ-ton tracing involves tracing a large number of γ-tons through a scene and then generating a desired weathering effect using recorded γ-ton transport information. For example, a stain may form in a sink due to a dripping faucet. Thus, a plurality of particles may be traced randomly from a source (e.g., the dripping faucet) to an object (e.g., the sink) whereby each particle may transport water and associated minerals, etc., to the surface of the sink, which, in turn, provides information to simulate a realistic sink stain.

Such an exemplary technique can produce weathering effects that are customized to scene geometry and tailored to any of a variety of weathering or aging sources. In various examples described herein, exemplary γ-ton tracing techniques are used to simulate global transport effects such as "stain-bleeding". Such exemplary γ-ton tracing also enables visual simulations of complex multi-weathering effects. Further, γ-ton tracing can generate weathering effects that not only involve texture changes but also large-scale geometry changes (e.g., deterioration of surfaces, etc.).

An exemplary computer-implementable method includes providing a computer-generated object wherein the object has characteristics, emitting a computer-generated particle, determining if the particle interacts with the object; and, if the particle interacts with the object, altering one or more of the characteristic of the object wherein the altering simulates weathering or aging of the object.

An exemplary computer-implementable method includes providing a computer-generated scene, tracing a computer-generated particle (e.g., a γ-ton) in the scene wherein the particle comprises one or more carrier attributes and one or more motion probabilities to determine motion of the particle in the scene and rendering the scene based at least in part on the tracing to simulate weathering or aging of the scene. Such tracing may alternatively, or in addition to, simulate a geometric erosion of an object in such a scene.

Figure 1A:
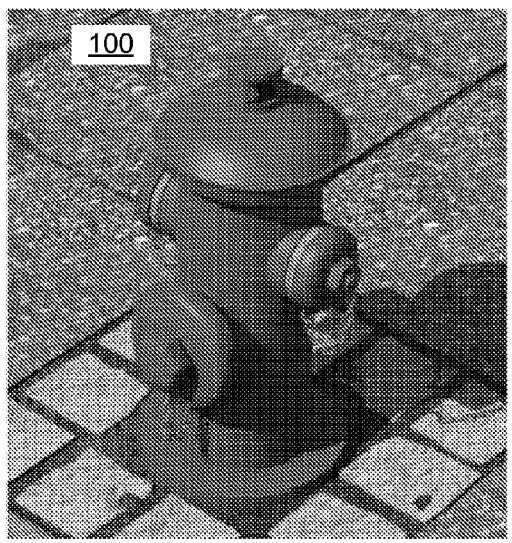
FIG. 1 is a series of scenes for an exemplary simulation of weathering.

FIGS. 1A-1D show an exemplary simulation of weathering of a scene 100. FIG. 1A presents an initial scene, which represents an initial state. Such a scene is, in general, computer-generated through use of software. Scenes generated through use of cameras, etc., may also be used, typically being transformed or transferred to a suitable computer-readable form.

Figure 1B:
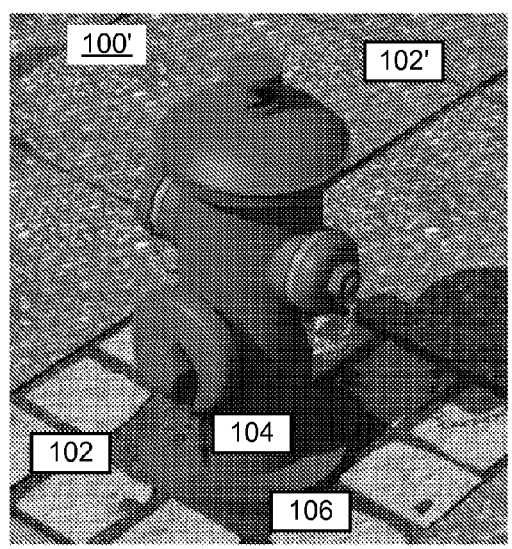
Figure 1C:
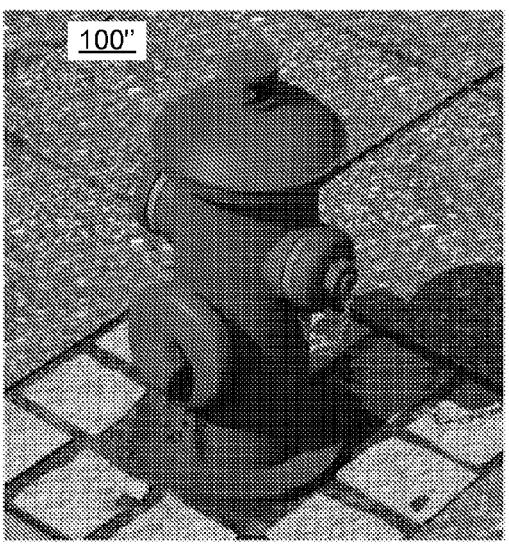
Figure 1D:
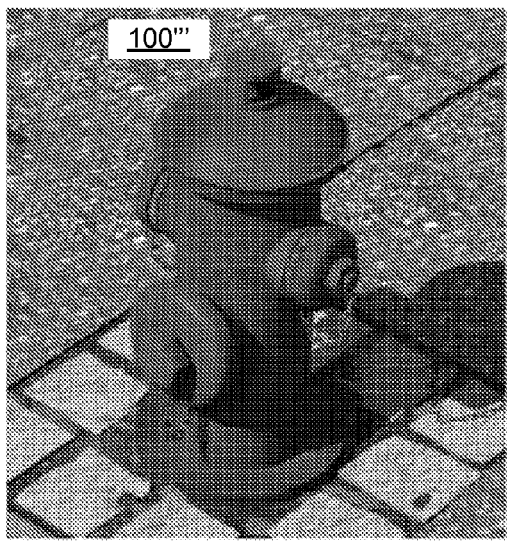

In the example of FIGS. 1A-1D, a red fire hydrant is surrounded by about a dozen paving stones, which are surrounded by larger square tiles. FIGS. 1B-1D exhibit how such a scene may be "aged" through use of γ-ton tracing. While the term weathering or aging may be used to describe various processes, other processes amenable to γ-ton tracing may not necessarily represent a forward progression in time. For example, a person visiting the fountain of youth may have wrinkles disappear as droplets of water (e.g., γ-tons) hit the person's face. In this example, the water droplets hitting the persons face may be considered a forward process in time while the increasingly youthful look of the person, i.e., wrinkle removal, is normally associated with time reversal. Thus, time is not a necessary condition for use of γ-ton tracing.

FIG. 1B shows aged scene 100', of the scene 100 of FIG. 1A, aged by some increment in time. Various labels aim to point out features associated with aging. Growth of moss 102, 102' occurs in spaces between the stones and tiles. A metal chain causes deposits to form on a surface of the fire hydrant 104 while dirt accumulates near the base of the fire hydrant 106. FIG. 1C shows an aged scene 100", of the scene 100' of FIG. 1B, aged by some increment in time. In the scene 100", more moss appears between the stones and between the tiles and more deposits and more dirt appear on the fire hydrant. FIG. 1D shows an aged scene 100''', of the scene 100" of FIG. 1C, aged by some increment in time. In the scene 100''', even more moss appears between the stones and between the tiles and even more deposits and more dirt appear on the fire hydrant. Thus, the sequence of FIGS. 1A-D illustrates how a scene of a hydrant may become increasingly rusty and dusty and how gaps between tiles may become colonized by moss in a realistic manner.

Simulation of weathering effects with γ-ton tracing can occur in an exemplary process that includes resampling to provide a model. For example, an object may be resampled to provide a point-based model of the object. Given the model, the exemplary process emits γ-tons from one or more γ-ton sources. The exemplary process traces the emitted γ-tons in a way similar to photon tracing. The exemplary process stores information from the emitting and tracing in a γ-ton map, for example, a γ-ton map that relies on the point-based model. The exemplary process can then use the γ-ton map to simulate the desired weathering effect(s).

As described herein, provided a γ-ton map describing γ-ton transport information for a scene or an object, one can generate various effects. For example, a γ-ton map can be used to modify surface material properties and geometry through, for example, multi-texturing, texture synthesis, or displacement mapping. Through use of γ-ton tracing iterations, a cumulative weathering effect over time can be modeled.

Referring again to FIGS. 1A-D, weathering of this scene was simulated using an exemplary process that relied on a point-based model of the scene, γ-ton emission, γ-ton tracing and rendering using a γ-ton map. With respect to specific weathering aspects of the scene that relate to physical phenomena, the exemplary weathering process considered that the gaps between the stones and tiles tend to collect more "humidity". Thus, in the example of FIGS. 1A-D, γ-tons act to transport hypothetical run-off water from exposed tile surfaces to the gaps, which, in turn, suggests that such locations are more easily colonized by moss. Further, once such areas are colonized, they tend to trap more humidity and hence result in even more growth of moss.

Exemplary γ-ton sources can model the sources of aging, which may come in various forms (e.g., forms such as point, area, environmental sources, etc.). A point source can be appropriate for effects such as a dribble of rust down a wall from a leaky pipe, whereas an environment source can be suitable for aging effects caused by ambient factors such as air pollution.

Exemplary γ-tons emitted from γ-ton sources can propagate through a scene, interacting with surfaces. For example, at each surface point, a surface property called γ-reflectance can be defined that affects the paths through which incident γ-tons are deflected. For purposes of efficiency, paths of γ-tons can be determined probabilistically by the γ-reflectance of interacting surfaces using Russian roulette (e.g., a random process). In general, interaction of γ-tons with surfaces in a scene not only affects the γ-ton paths, but also enables γ-transport. Specifically, a γ-ton impinging at a surface point can pick up material (e.g., blemishes, etc.) from that point and deposit them in subsequent surface interactions (e.g., consider how a rubber ball picks up and transports dust as it bounces along a dusty floor). While the surface property γ-reflectance has been mentioned as an example, other surface properties may be defined as alternatives or in addition to reflectance.

Exemplary γ-ton tracing can generate aging effects that are customized to scene geometry and tailored to aging sources. Through iterative γ-ton tracing, an aging sequence can be readily produced with consistency between consecutive frames. Iterative γ-ton tracing also allows for modification of parameters such as the γ-reflectance of one or more surfaces, for example, using a γ-ton map from a previous iteration. Thus, previous results can be used to affect subsequent γ-ton tracing. Such linking between results is useful for modeling a variety of aging effects, for example, the real-world phenomenon of already rusty areas rusting faster can be modeled via iterative updating the γ-reflectance of the rusty area so as to trap more rust-inducing γ-tons.

As already mentioned, γ-ton tracing can be associated with a transport feature (e.g., γ-transport), which may act locally, globally or in another manner. Further, because γ-ton tracing can allow for blemishes of one area to be transported to another area undergoing, for example, a different type of aging process, γ-transport can enable visual simulations of complex multi-weathering effects that result from multiple co-existing and interacting processes.

Another feature of γ-ton tracing allows for generation of effects (e.g., weathering, etc.) that not only involve texture changes but also geometry changes. Geometry changes can be achieved by working through iterations. For example, a geometry change for an iteration can be implemented as a displacement map defined according to a given γ-ton map. In a subsequent iteration, γ-ton tracing and displacement mapping can be performed on top of the displaced geometry from the prior iteration. For this reason, large-scale geometry changes such as those that occur in corrosive and erosive weathering can be achieved with using various exemplary techniques described herein.

Such an exemplary displacement mapping technique can simulate phenomena like moss growing and because moss has a thickness. For large-scale geometry, a γ-ton map can be used for direct displacement of an object's vertices. In general, such a large-scale geometry change includes retiling of the original geometric model before performing a displacement operation. Retiling is a technique to re-distribute the vertices of a model. Retiling an object allows for representation of the object by dense vertices. An increase in density generally increases precision of a deformation process. A retiling operation can be performed for each iteration to ensure adequate density or distribution of vertices.

While various examples may have a physical explanation, such as for the hypothetical water run-off from the tiles to the gaps, γ-ton tracing does not require use of a physical model. In the example of FIGS. 1A-1D, γ-tons were emitted from a source to mimic rain falling from the sky and once the γ-tons contacted the tile surfaces, they propagated or "flowed" along the surface, which increased the "humidity" of the gaps and resulted in a call for growth of moss in the gaps. Thus, various exemplary γ-ton-based visual simulation approaches can achieve desirable visual effects without resort to physically accurate simulation processes.

With respect to rain, consider the following three examples:

1. γ-tons (i.e., rain drops) fall from sky. The γ-tons hit the ground and carry mud from the ground to a nearby wall. In this example, γ-tons carry or transport the mud and a need does not exist for a subsequent surface properties and geometric update step. Thus, in this example, due to the nature of the γ-tons (e.g., mud color), emitting and tracing provide the requisite information for weathering.

2. γ-tons (i.e., rain drops) fall from sky. The γ-tons hit a steel train. The humidity of the train surface is increased. The humidity of the surface results in the appearance of rust. In this example, γ-tons act to increase the train surface's humidity and a surface properties update step is called to convert the humidity to rust.

3. γ-tons (i.e., rain drops) fall from sky. The γ-tons hit a steel train. The humidity of the train surface is increased. After a surface properties update step, rust appears on the train surface. However, rain keeps falling. Thus, γ-tons are emitted whereby at least some γ-tons can act to take rust from the train surface to the ground. In this example, an iteration based on former result can simulate transport of rust from the train to the ground.

Figure 2:
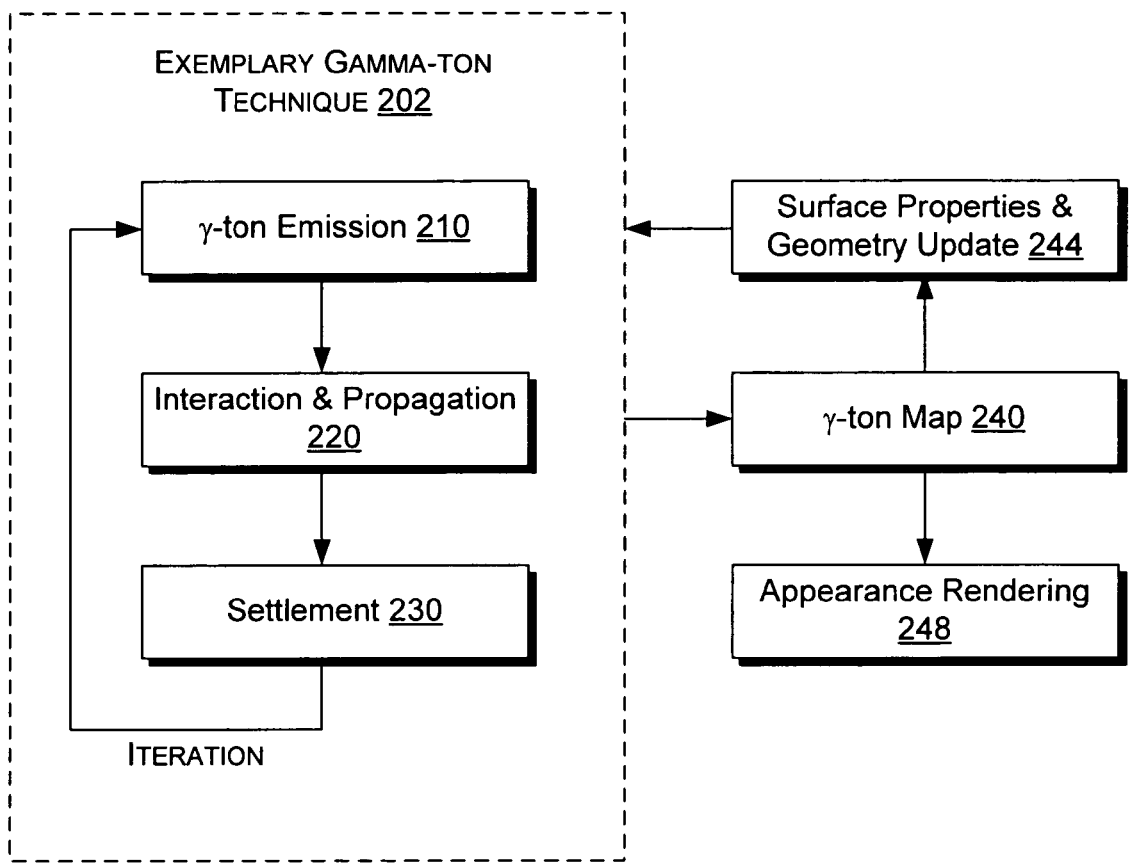
FIG. 2 is a diagram of an exemplary method for altering a scene.
Figure 3:
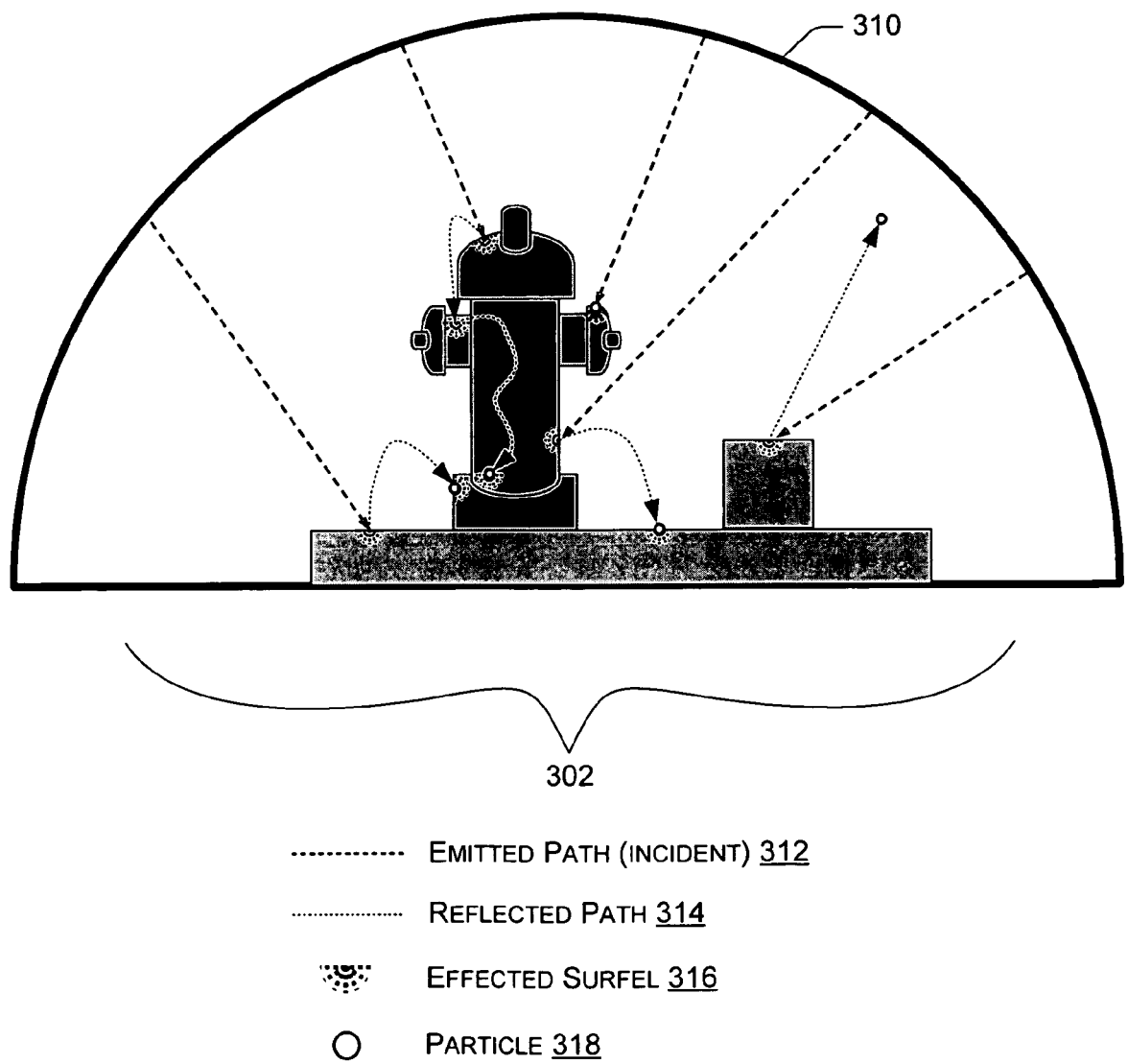
FIG. 3 is a diagram of an exemplary method whereby particles and reflected particles can affect surface elements and transport properties related to surface elements, which may optionally include geometry alterations.

FIG. 2 shows an exemplary method or framework 200 for altering a scene. The exemplary method 200 relies on an exemplary iterative γ-ton technique 202 that commences with an emission or shooting block 210 that enters an interaction and propagation block 220, which is followed by a settlement block 230. Propagation is sometimes referred to herein as secondary interactions, which may be zero or many. The term "interactions" may include initial interactions and secondary interactions, as appropriate. In the example technique 202, an iterative loop exists between the settlement block 230 and the shooting block 210. In a typical example, for each iteration, thousands of γ-tons are created and emitted from a γ-ton source (e.g., the emission block 210). The emitted γ-tons interact and propagate in the scene (e.g., the interaction and propagation block 220) until they "settle" (e.g., the settlement block 230). Settlement refers to the end of interaction and propagation of the emitted γ-tons, for example, whether all γ-tons have either settled, have substantially settled (e.g., per some limit) or have allowed to propagation for a certain number of secondary interactions, etc.

Information regarding interaction and subsequent propagation can be recorded or used directly for a desired effect, for example, to catalyze weathering on various encountered surfaces. A map block 240 may be used to record γ-ton information and such information may be subsequently used in a surface property or geometry update block 244 or an appearance rendering block 248.

With respect to behavior of the emitted γ-tons in a scene, propagation can be stochastically determined through use of motion probabilities and properties such as γ-reflectance of the encountered surfaces. At each interaction or encounter, a γ-ton may act to transport "material" or property characteristics. For example, a γ-ton may pick up or deposit a substance or substances on the encountered surface. Such transport of substances can be used, for example, to determine a distribution of blemishes.

As already mentioned, interaction and propagation information may be recorded. For example, in various examples, a point-based model that involves re-sampling is used to record stochastic weathering contributions from γ-tons and to represent local surface attributes. In such a model, surface elements are referred to as "surfers", where each generated surfel maintains properties such as γ-reflectance and other material properties. Again, γ-reflectance affects how an incident γ-ton deflects from a surface while other material properties can, for example, keep track of essential substances for weathering, etc.

For modeling a blemish, one or more material properties may be specified. For example, accumulation of "blemish" (as a material property) over various surfels can form a distribution of blemishes. Referring again to the exemplary method 200, the distribution of such a material property can be recorded in the form of a γ-ton map 244.

In general, the nature of the map or whether a "map" is used to record information is related to the choice of model. Thus, for the aforementioned point-based model that relies on surfels, a γ-ton map is a point-based map that allows for handling a wide range of geometric representations of input scenery.

As indicated in the exemplary method 200, the map 240 can be used in an update block 244 to update various properties or geometry as appropriate. For example, weathering induced by γ-tons can be used to change surface properties which, in turn, can affect subsequent iterations. For example, once a surface is rusty, its roughness can increase and a related increase in a roughness property can act to cause trapping of more γ-tons. The feedback in such a loop has the overall effect of an ever increasing rusting rate. Of course, roughness may reach a maximum value or other limit, which could thereby limit the rate or modification to a scene.

The exemplary method 200 indicates that surface properties can be updated 244 based on a γ-ton map 240 obtained from a prior iteration (e.g., the last iteration). Depending on the nature of the desired effect, (e.g., corrosion and erosion), displacement of geometry may occur through use of information stored in the γ-ton map 240 (or otherwise provided by the exemplary γ-ton technique 202). Large-scale and cumulative erosive weathering is achieved through iterative tracing of γ-tons on deformed geometry. With the γ-ton map, the stochastic visual appearance of weathering can be rendered with different levels of texturing and procedural techniques, including multi-texturing, displacement mapping, and texture synthesis. The choice depends on the nature of weathering. The growth of weathering can be rendered with frame consistency according to, for example, a time-ordered sequence of γ-ton maps.

Referring again to the fire hydrant example of FIG. 1A-D, FIG. 3 shows a simplified schematic or scene 302 of a fire hydrant that further shows a particle source (e.g., a γ-ton source) 310, emitted particle paths (e.g., emitted γ-ton paths) 312, reflected or propagated particle paths (e.g., propagated γ-ton paths) 314, effected surfels 316 and particles (e.g., γ-tons) 318 that may act to transport properties. In this example, the source 310 is hemispherical and acts to emit particles in the scene 302. Initial trajectories or paths 312 are shown for five exemplary particles 318 interact with various objects in the scene 302. In this example, each of the particles 318 acts to affect at least one surface element 316.

Referring again to the various particle paths 312, one of the incident particle paths interacts with the top portion of the hydrant. This particular particle affects a surface element and then propagates to another site where it affects another surface element. However, this is not the end of the effect of this particle as it propagates once again to interact with a surface element near the base of the hydrant. This last interaction may correspond to settling and may include a transport component where a property is transported, for example, from a prior impacted surface element to the last impacted surface element. Thus, a single γ-ton may affect numerous surface elements or other elements of a scene.

Another particle on the right side of the scene 302 acts to transport material from a box object in a manner that can remove this material from the scene. In actuality, as implemented, a material property of the box object is transformed by its interaction with the particle (e.g., γ-ton) in some prescribed manner.

Two of the particles act to transport material from one object to another object. Again, as implemented, a material property of an object is transformed by its interaction with a particle (e.g., a γ-ton) in some prescribed manner and another object is transformed by this prior interaction, in some prescribed manner.

Figure 4A:
FIGS. 4A-C are an exemplary object, a point-based model of the object and an information map based on information obtained via application of an exemplary method to the object.
Figure 4B:
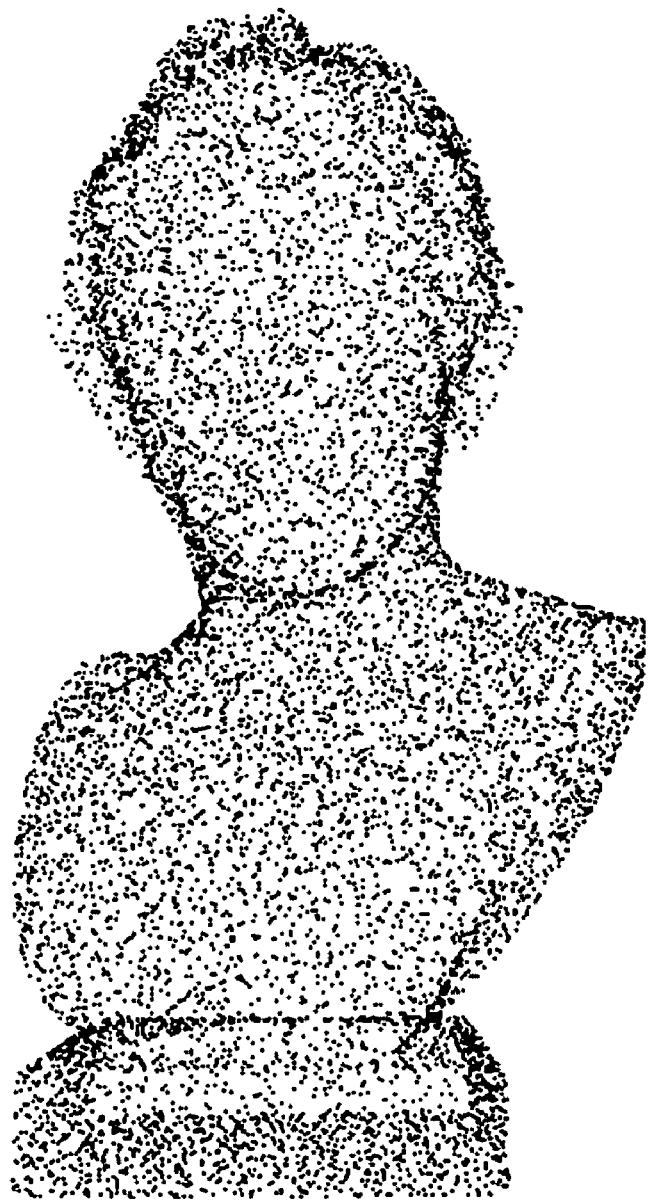
Figure 4C:
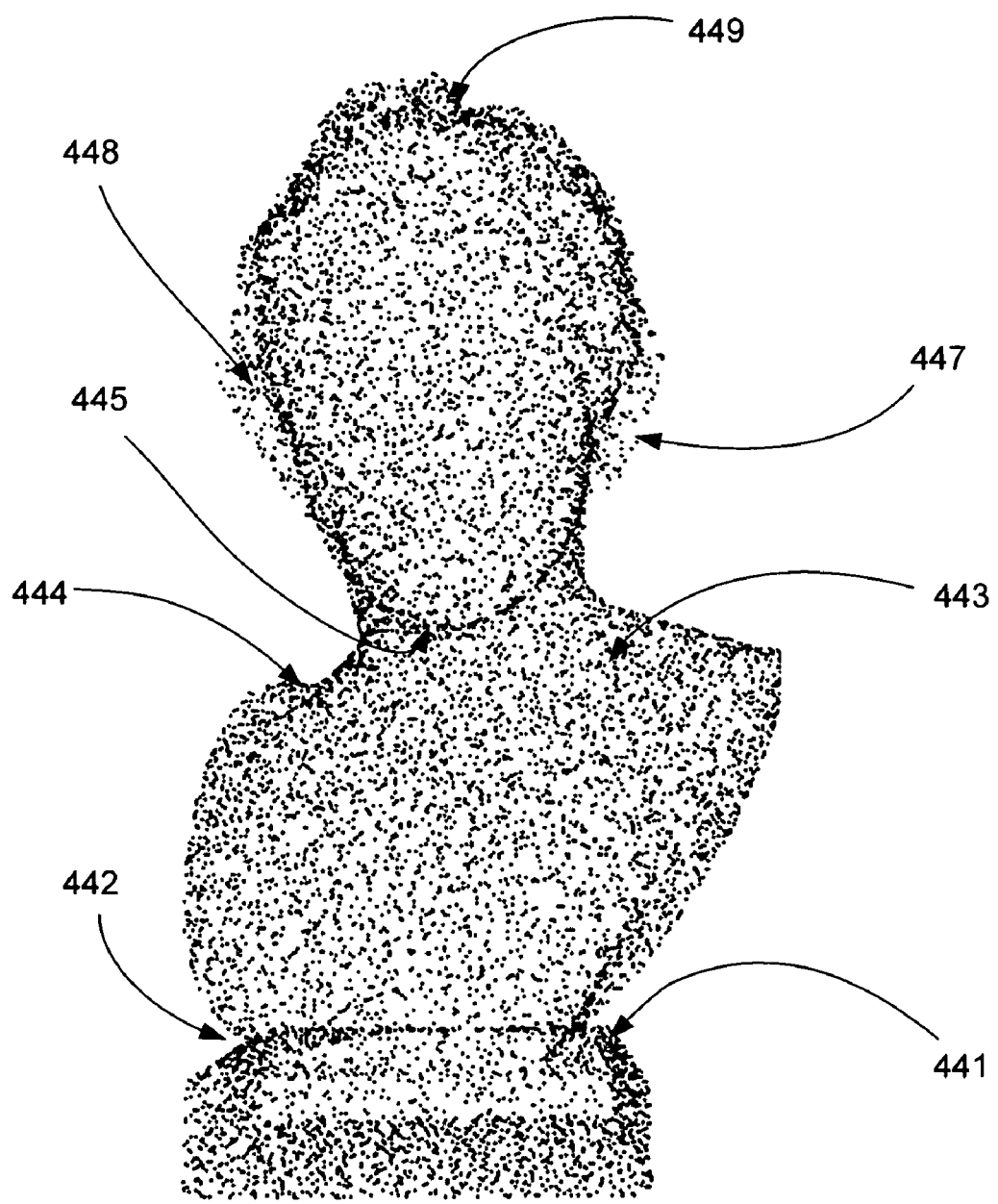

FIG. 4A-4C show an exemplary image 400, an exemplary object element map 410 and an exemplary gamma-ton information map 420. The exemplary image 400 is of a bust with various surface contours, crevices, etc. A point-based model is used to transform or resample the object to create a model representation of the object, which in this instance is the object element map 410 of FIG. 4B. Of course, a pre-existing map, such as a finite-element map used in object generation, may be used as a substitute for re-sampling.

In forming the model element map 410, density may be specified as uniform, gradient-based, etc. For example, gradient-based density may account for color gradients, intensity gradients, spatial gradients (e.g., consider crevices near ears of the bust), etc. The exemplary element map 410 has a substantially uniform density of points on the surface of the bust where each of the points represents a location of a surface element (e.g., surfel).

FIG. 4C shows the exemplary γ-ton information map 420, which includes information produced as γ-tons emitted from a source or sources interact with the various surfels. In this example, as described further below (see, e.g., the exemplary method 700 of FIG. 7), the information is related to blemishes. For example, consider aging or weathering of a bronze statute upon exposure to air, rain, etc. More specifically, the areas indicated by arrows 441, 442, 443, 444, 445, 447, 448, and 449 have surfels affected by γ-tons such that such surfels will be transformed to illustrate the presence of a metallic patina.

However, prior to discussing the resulting aged or weathered bust, various mathematical aspects are described that may be used for implementing various exemplary methods. In particular, various exemplary γ-tons and γ-ton sources, exemplary reflectance and material properties, exemplary propagation and transport are discussed followed by a discussion of the aged or weathered bust of FIG. 4A.

With respect to γ-tons, an exemplary γ-ton typically includes two main kinds of attributes, motion attributes and carrier attributes. Motion attributes relate to motion probabilities of a γ-ton and account for its motion behavior in a scene. Carrier attributes relate to transportation capabilities, for example, material properties or substances being carried by a γ-ton. In general, γ-tons include one or more motion attributes while carrier attributes are optional and extensible depending on the desired effect being modeled.

An exemplary γ-ton may have the following attributes:

```
Ton {
Motion probabilities:
    k_s, k_p, k_f;    // Probability of propagating along a straight line (s),
                      // parabolic curve (p), or flowing (f)
    Carrier attributes:
    s_h;              // Humidity
    s_d;              // Amount of dirt
    s_f;              // Amount of fungus
    ...
}
```

In this example, the path of a γ-ton is stochastically determined by its motion probabilities ($k_s$, $k_p$, $k_f$). In this example, as well as others, motion probabilities may include motion probabilities for straight line motion, motion probabilities for parabolic motion and motion probabilities for flow substantially along a surface. Others types of motion probabilities may be used, alternatively, or in addition to one or more such aforementioned motion probabilities.

With respect to the carrier attributes, such attributes may allow for altering one or more characteristics of an object based at least in part on two or more carrier attributes associated with a particle (e.g., a γ-ton). In such an example, such altering may allow for interaction between at least two of the carrier attributes. For example, as described herein the two or more carrier attributes may include a water carrier attribute and a water dependent carrier attribute (e.g., rust, growth of fungus, etc.) or a wind carrier attribute and a wind dependent carrier attribute or a combination of such attributes.

Figure 5A:
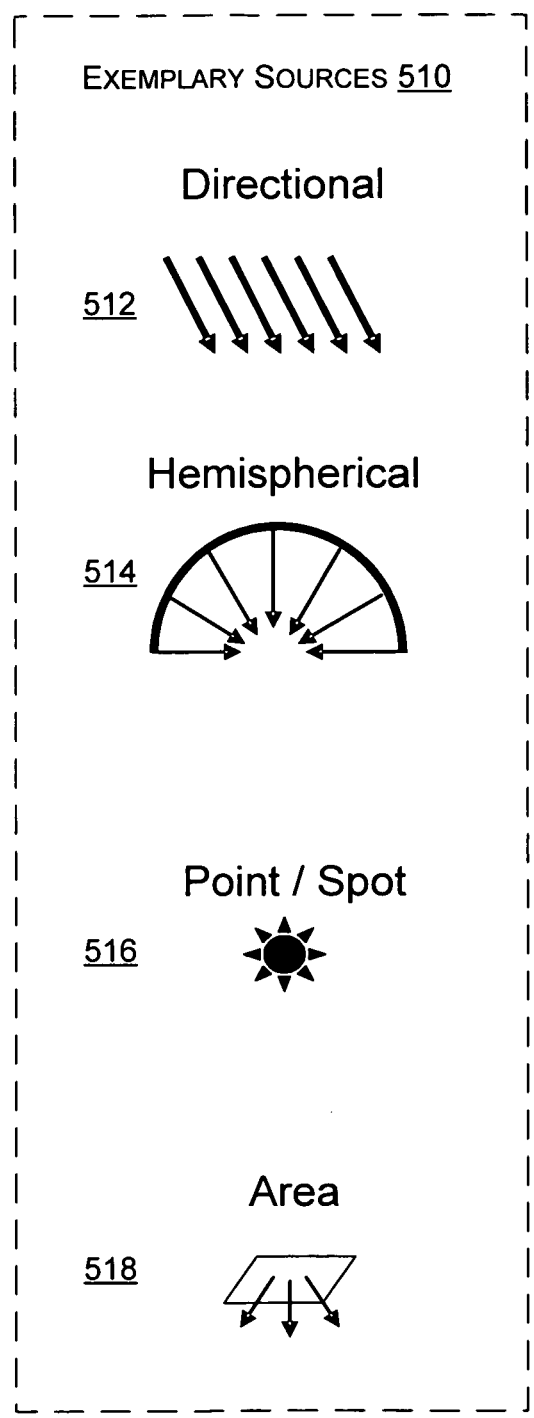
FIGS. 5A-B are diagrams of various exemplary sources and various exemplary motion states, respectively.

Exemplary γ-tons are emitted from one or more sources. FIG. 5A shows various exemplary sources 510. The sources 510 include a directional source 512, a hemispherical source 514, a point source 516 and an area source 518. An exemplary method may use one or more of such sources or other sources. While a hemispherical source 514 is shown, arc sources, sections of a sphere, sections of a three-dimensional surface, etc., may be used to represent a source. Thus, to mimic a wide variety of natural aging sources, exemplary γ-ton sources can be in the form of point, area, environment sources, etc. A point source, for example, can be used to model the dribble of rust from a leaky pipe. A special type of point source may be a "spotlight" γ-ton source that emits or shoots γ-tons within a restricted range of directions. In contrast, most atmospheric weathering exhibits "ambient"-like effects that can be accounted for by environment sources (e.g., a hemispheric source). For most examples described herein, two γ-ton sources were employed: an enclosing environment source (see, e.g., the source 310 of FIG. 3) and an overhead area source which emits γ-tons vertically downward.

Figure 5B:
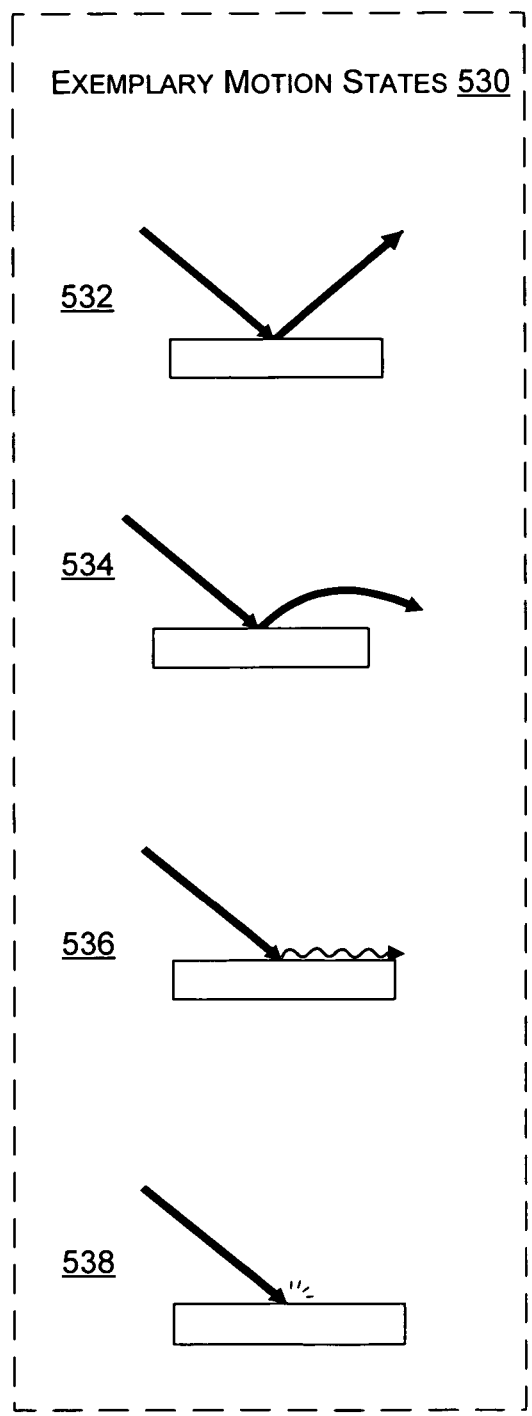

At any given state of calculation, a γ-ton is generally in only one motion state. FIG. 5B shows various exemplary motion states 530, which include propagating in space along a straight line 532, propagating in space along a parabolic trajectory 534, adhering and flowing on a surface 536, or settling on a surface 538. Of course, other states are possible.

Motion probabilities represent the motion energy of a γ-ton and a γ-ton can propagate in as long as it retains sufficient energy as required by the particular form of propagation. For example, the exemplary motion states 532, 534 and 536 require some motion energy to occur. Once a γ-ton runs out of energy, it settles.

With respect to path determinations, the path of a γ-ton can be parabolic if, for example, it propagates in space and carries weight (e.g., analogous to a real object traveling in space under the influence of gravity). In general, the sum of all motion probabilities must be less than or equals to one, i.e., $k_s+k_p+k_f \leq 1$. Hence, the probability of settling can be implicitly represented as $(1-k_s-k_p-k_f)$. Unless a spatial or area property (e.g., a gravity transform, etc.) is used, these motion probabilities do not change until the γ-ton impinges upon a surface, where these probabilities change according, for example, to the γ-reflectance of the surface. In other words, open space in a scene (e.g., water, air, etc.) generally allows for unimpeded travel of a γ-ton.

As already mentioned, carrier attributes can account for any possible substance or material property being carried by a γ-ton. The number of attributes is scalable and depends on the effect being modeled. In addition to weathering-catalyzing γ-tons, one can also design weathering-resisting γ-tons which carry weathering-resistant substances.

For example, γ-tons can carry "heat" substance to mimic the sunshine which reduces corrosive substances such as "humidity" on a metallic surface.

Various aspects of exemplary reflectance and material properties are described below. In general, these properties corresponding to the motion and carrier attributes of γ-tons. Again, the two main types of surface properties are γ-reflectance and material properties. Reflectance, also referred to as "γ-reflectance", $(\Delta_s, \Delta_p, \Delta_f)$ determines how incident γ-tons deflect. Material properties can record, for example, the amount of blemish or other substances on a surface. An exemplary property list for a surfel follows:

```
Surf {
    γ-reflectance:
        Δ_s, Δ_p, Δ_f;        // Deterioration rate for k_s, k_p, k_f
    Material properties:
        s_h;                   // Humidity
        s_d;                   // Amount of dirt
        s_f;                   // Amount of fungus
        ...
}
```

For most applications of γ-tons, γ-reflectance is compulsory while material properties are optional and extensible depending on the effect being modeled. For example, if the growth of moss is being modeled, the amount of moss seed can be introduced both as a carrier attribute of γ-ton and a material property of one or more surfaces.

When a γ-ton impinges on a surface, its motion probabilities $(k'_s, k'_p, k'_f)$ are deteriorated according to the following set of exemplary equations:

$$k'_s = \max(k_s - \Delta_s, 0) \quad (1)$$

$$k'_p = \max(k_p - \Delta_p, 0) \quad (2)$$

$$k'_f = \max(k_f + \max(k_p - \Delta_p, 0) - \Delta_f, 0) \quad (3)$$

In this example, the set of deterioration equations is fixed to free the user from the task of tuning an excessive number of parameters. Initial surface attribute values may be set by the user. Of course, if desired, more parameters may be used together with tuning or other means of selecting values.

As already mentioned, a γ-ton is normally emitted from a source along a straight line. The direction of travel can be stochastically determined by the property of the γ-ton source as in, for example, photon tracing. As already described, a γ-ton may bounce in a scene until it settles down on a surface, flies out of the scene, etc. In various examples, settling down on a surface and flying out of a scene were used.

With respect to interaction with an object such as a surface, when a γ-ton impinges on the surface, examples presented herein used a stochastic Russian roulette algorithm to determine subsequent motion probabilities for the γ-ton. An exemplary Russian roulette algorithm uses a uniformly distributed random variable ξ in the set [0, 1] and makes the following decision:

Reflect if ξ in the set $[0, k_s]$,
Bounce if ξ in the set $(k_s, k_s+k_p]$,
Flow if ξ in the set $(k_s+k_p, k_s+k_p+k_f]$, and
Settle otherwise.

For reflected or bounced γ-tons, one may regard the surface as "diffuse" and evenly distribute the outgoing directions over the upper hemisphere centered at the surface point. In this example, unless the γ-ton settles on the surface, its motion probabilities are modified according to the local γ-reflectance of the surface and the γ-ton continues to travel with the new motion probabilities. For a bounced γ-ton, the distance of a bounce is a parameter a user may supply for each type of γ-ton in a particular exemplary system.

As a γ-ton propagates, it can pick up and deposit substances on the interacting surfels. Of course, a γ-ton may pick up or deposit, as appropriate. Such processes are referred to herein as γ-transport. Such removal and introduction of substances can act to simulate weathering.

Figure 6:
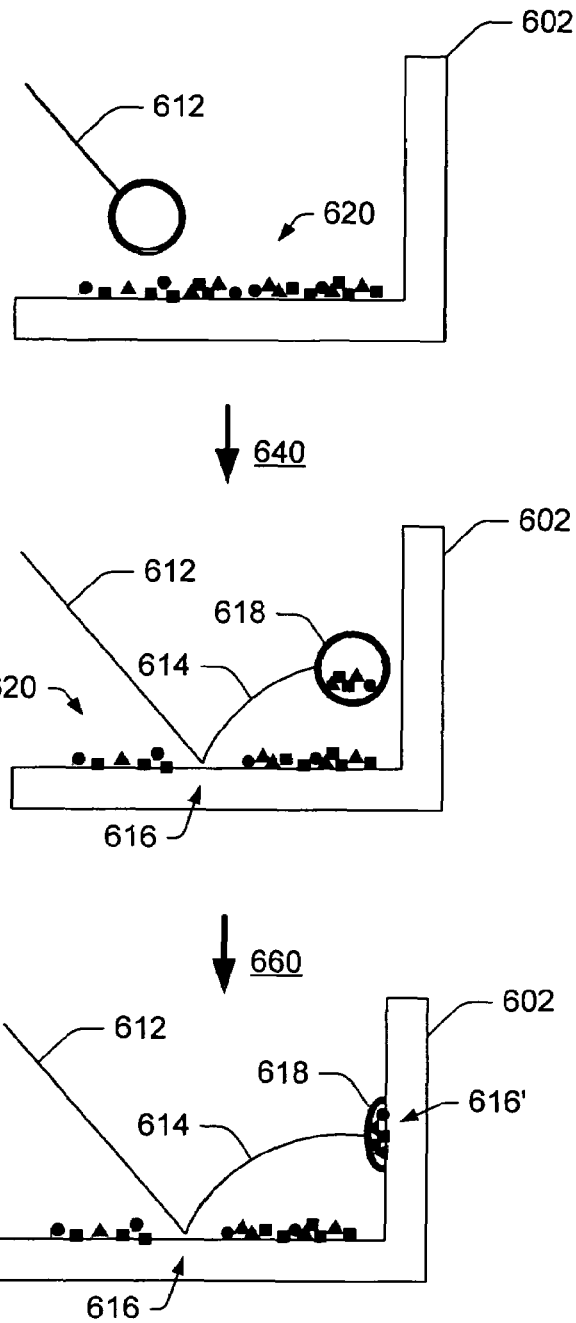
FIG. 6 is a diagram of an exemplary method that provides for transportation of one or more characteristics.

FIG. 6 shows an exemplary transport method 600. The exemplary method 600 starts with shooting or emission of a γ-ton 612 in a scene having an object 602. The object 602 includes a surface having surface characteristics, for example, color, material, etc. In this example, a surface of the object 602 includes three types of surface material 620, represented by a collection of solid triangles, squares and circles. Interaction 640 occurs when the γ-ton impacts a surface element 616 to thereby alter one or more characteristics (e.g., properties of the surface element). Of course, some surfaces may have characteristics that are not altered by such an impact. In this example, the interaction 640 causes the γ-ton to gather information about the surface element 616, specifically to remove and transport five of the surface material components 618 from the surface element 616 and thereby alter the surface element 616. The γ-ton 612 continues as γ-ton 614 with the material components 618 and then impacts another surface element 616'.

An exemplary transport method defines γ-transports in a form: $a \leftarrow a+b \cdot k$, where a and b are either carrier attributes of the γ-ton or material properties of the interacting surface. In this exemplary transport representation, k is a scalar weight. For example, one may describe a dust contribution $s_d$ of a dust-carrying γ-ton "Ton" to a surface "Surf" as follows: $\text{Surf}.s_d \leftarrow \text{Surf}.s_d + \text{Ton}.s_d \cdot k$. With a series of such exemplary γ-transports, complex weathering effects can be modeled.

During γ-ton propagation, a trace of the path of a γ-ton may occur to identify the surface to be impacted. For a γ-ton traveling in a straight line, an intersection test to determine an impacted surface is used (e.g., consider ray tracing). For a γ-ton traveling along a parabolic curve, its trajectory can be piecewise linearly approximated. For a γ-ton flowing on a surface, the γ-ton can move a small dimensional step, for example, substantially along a tangent direction of the surface and interacts with the surface at one or more new positions. The step size may be a constant for a given type of γ-ton or otherwise specified.

In various examples presented herein, an intersection test was performed on an original surface model and a spatial partitioning scheme was designed and used for tracing to accelerate the test. According to this exemplary process, once the point of intersection is computed, a look up of nearby surfels occurs where the look-up is accelerated by organizing all surfels in a kd-tree.

As described herein, γ-ton interaction, propagation and transport can change properties of objects in a scene. For example, the introduction of rust particles increases the surface roughness, which in turn can affect γ-ton reflectance of the surface. Such properties can be updated based on an exemplary γ-ton map obtained from a prior γ-ton iteration. Further, in cases such as corrosion and erosion, geometry can be deformed according to an exemplary γ-ton map. Various exemplary methods can include surface property alteration and geometry alteration through use of exemplary γ-tons. Cumulative effects can be accomplished through performing such property or geometry updates in an iterative manner.

Figure 7:
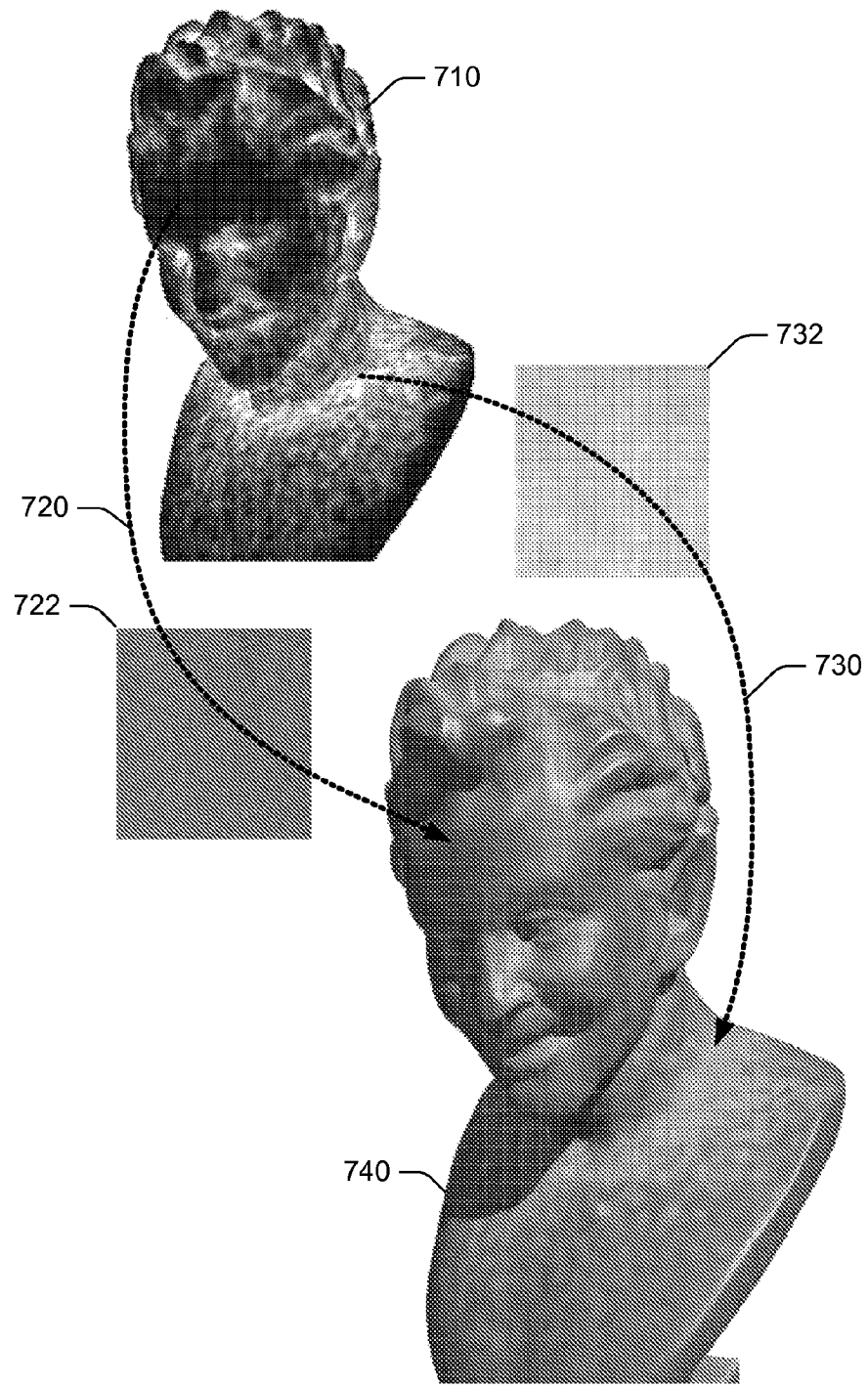
FIG. 7 is a diagram of an exemplary method to simulate patina on a metallic bust.

Given the foregoing discussion, the example of FIG. 4A-C is described in more detail with reference to the exemplary method 700 of FIG. 7. Again, this example aims to visually simulate a metallic patina on a bust. To simulate the metallic patina, a spherical environment γ-ton source was selected to shoot γ-tons "Ton" with the following attribute values:

```
Ton {
    k_s = 1; k_p = 0; k_f = 0;
    s_p = 1;              // Amount of patina
}
```

According to these attribute values, the γ-tons travel in a straight line (Ton.$k_s$=1) and carry patina (Ton.$s_p$=1). The surface property of a metal surface of the bust (e.g., bronze or copper surface) is initialized as:

```
Surf {
    Δ_s = 0.5; Δ_p = 0; Δ_f = 0
    s_p = 0;              //Initially, no patina
}
```

According to these attributes, the original surface is highly reflective and has no initial patina. In this example, a settled γ-ton introduces patina to the surface according to the following γ-transport rule: Surf.$s_p$←Surf.$s_p$+0.05·Ton.$s_p$. Since the motion probability $k_s$ of a γ-ton "Ton" drops significantly with each bounce, about half of the Batons will settle down after first bounce and the remaining will bounce approximately twice. As a result, a region with low accessibility (e.g., a crevice) can easily trap motion-deteriorated γ-tons and accumulate patina.

Referring again to the various arrows 441-449 in the exemplary information map 420 of FIG. 4C, γ-tons have accumulated in areas with low accessibility. In FIG. 7, a surface representation 710 is shown for the map 420. In the representation 710, the points of the map 420 have been applied to respective surface elements. The graded areas shown along a spectrum from black and white (various shades of gray between extrema), is used to determine occurrence of a metal color and texture 722 via a process 720 and to determine occurrence of a blemish color and texture 732 via a process 730. In other words, a weathering appearance is rendered by multi-texturing with two textures, one with patina and one without.

In the exemplary method 700, the γ-ton map values are used to blend these two textures through use of alpha-blending, where the result is the rendered object 740. Various other examples presented herein also use alpha-blending for rendering.

The example of FIGS. 4A-4C and 7 demonstrates that an exemplary γ-ton technique can effectively generate convincing weathering effects with minimal user effort. As such this exemplary technique serves the intended purpose of capturing the visual effects of weathering phenomena.

Figure 8:
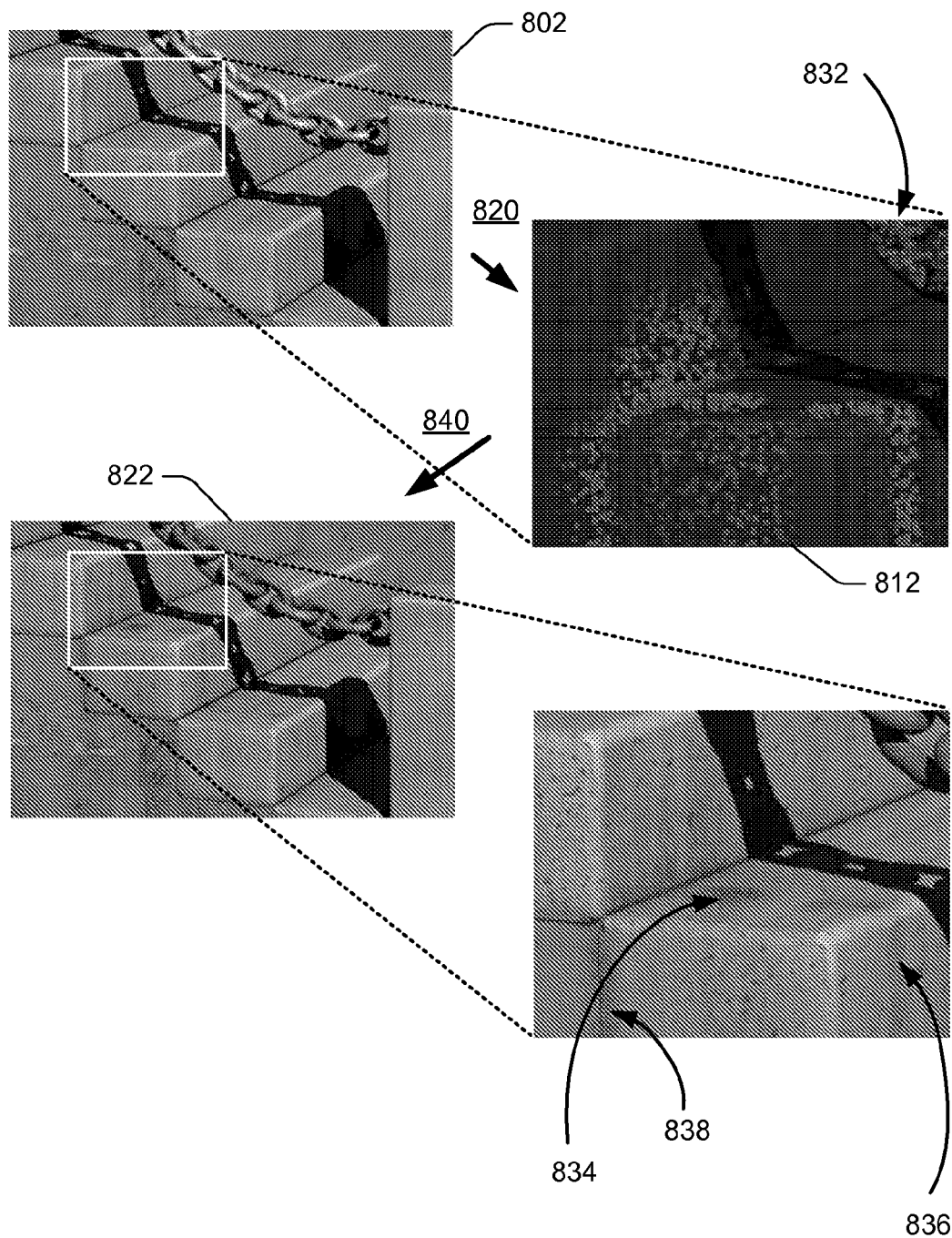
FIG. 8 is a diagram of an exemplary method of stain-bleeding that simulates transportation of a blemish substance from one region to one or more other regions.

FIG. 8 shows an exemplary method 800 that includes simulating weathering associated with a chain. This weathering process is referred to as stain-bleeding. For example, stain-bleeding may occur where a surface near stained surfaces tends to get stained indirectly by dirty water splattered or flown from the nearby stained surfaces. The rusty chains in FIG. 8 cause rust stains on the concrete staircase beneath. The exemplary method 800 simulate "stain-bleeding" with an exemplary γ-ton technique that relies on transport capability of γ-tons.

The example in FIG. 8 is generated by γ-ton tracing followed by rendering through multi-texturing. More specifically, shooting and interacting 820 allows for formation of an exemplary γ-ton information map 812 related to an initial scene 802. Next, rendering 840 occurs to apply the map 812 to the initial scene 802 to thereby produce a rendered, altered scene 822. Notice that this exemplary γ-ton technique not only induces rust on the iron chain, but also carry rust particles to the staircase. Induction of rust on the chain is more clearly seen in the map 812, per the arrow 832; whereas, rust on the staircase is shown in the enlarged section per arrows 834 and 836.

In the example of FIG. 8, two forms of "stain-bleeding" can be seen, one due to bouncing and the other due to flowing. Exemplary bouncing γ-tons bring rust particles from the nearby stain spots on the steps 834 to a lower vertical face 836. Exemplary flowing γ-tons further propagate stains downward, especially along the cracks 838. In this example, one can note the different types of stain patterns formed by bouncing and flowing γ-tons, as captured by the γ-ton information map.

For the example in FIG. 8, the motion probabilities of γ-tons was ($k_s$, $k_p$, $k_f$)=(0.0, 0.8, 0.2), whereas γ-ton carrier attributes included humidity ($S_{humidity}$) and rust ($s_{rust}$) with initial values of $s_{humidity}$=1 and $s_{rust}$=0. For both the cement staircase and the metallic chain, γ-reflectance is ($Δ_s$, $Δ_p$, $Δ_f$)= (0.0, 0.4, 0.05) and material properties, including humidity and rust, are initialized as $s_{humidity}$=0 and $s_{rust}$=0. The γ-transport rules for the cement staircase and wall are Surf.$s_{humidity}$←Surf.$s_{humidity}$+0.1·Ton.$s_{humidity}$; Surf.$s_{rust}$←Surf.$s_{rust}$+0.1·Ton.$s_{rust}$; while the γ-transport rule for the metallic chain is Surf.$s_{humidity}$←Surf.$s_{humidity}$+ 0.1·Ton.$s_{humidity}$; and the γ-transport rule for γ-tons is Ton.$s_{rust}$←Ton.$s_{rust}$+Surf.$s_{rust}$, which represents the transfer of rust particles from the chain to γ-tons.

After each γ-ton tracing iteration, we update the surface properties of the chain as follows:

Surf.$s_{rust}$←Surf.$s_{rust}$+0.015·Surf.$s_{humidity}$;

Surf.$s_{humidity}$←Surf.$s_{humidity}$−0.5·Surf.$s_{humidity}$;

Various exemplary techniques can simulate several weathering effects that may often take place simultaneously or interact with each other to generate more complex weathering effects. In general, such interactions cannot be readily simulated by individually modeling multiple weathering and blending their results. Various exemplary techniques described herein can simulate complex interactions among multiple weathering processes because of the multiple γ-transport ability of γ-tons and iterative updates of surface properties and geometry.

Figure 9A:
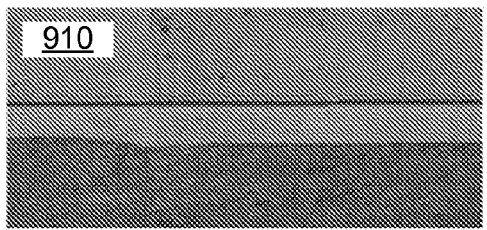
FIGS. 9A-9D are a series of scenes and corresponding γ-ton maps where
Figure 9A:
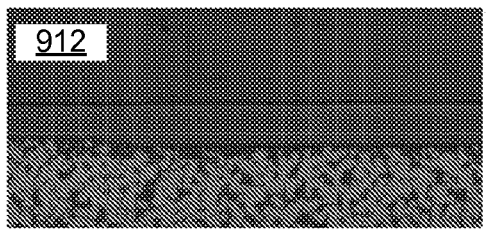

FIGS. 9A-9D show an exemplary simulation method 900 of a multi-weathering scenario with two interacting weathering processes, moss growth on the ground and dirt splattering near the bottom of the cement wall. The ground is initialized with a large amount of dirt and a small number of seeds for the moss. In FIG. 9A, the scene 910 is without moss and with little to no dirt on the wall. The corresponding initial property map 912 shows dirt with imbedded moss seeds and little to no moss. As γ-tons propagate through the scene, they can pick up materials (moss seed, moss or dirt) from the ground and transport them to other places. If they pick up soil, they expedite "stain-bleeding" from the ground to the bottom of the cement wall. If they pick up moss, they facilitate the moss colonization. As the moss-covered areas grow, more soil is covered and thus less likely to be splattered onto the cement wall. In other words, the growth of moss suppresses the splattering of dirt onto the wall. An exemplary method can naturally model such interactions by modifying the γ-reflectance of the ground after each γ-ton tracing iteration. As a result, γ-tons become more likely to be trapped in moss-covered regions.

Figure 9B:
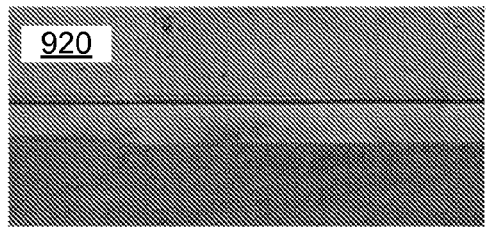
Figure 9B:
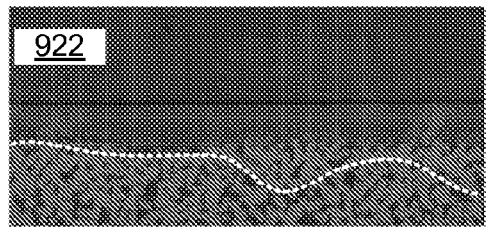
Figure 9C:
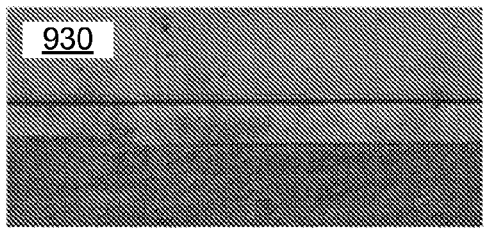
Figure 9C:
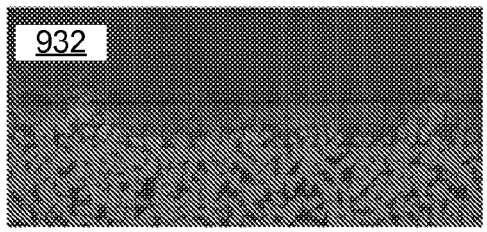
Figure 9D:
Figure 9D:
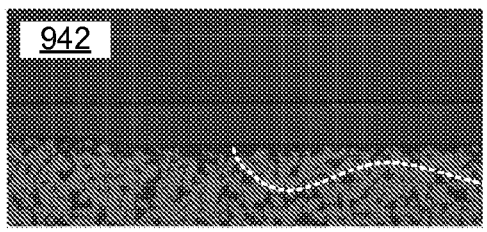

The result of multi-weathering can be seen by comparing the scenes 920, 930 and maps 922, 932 of FIG. 9B and FIG. 9C. The "stain-bleeding" (γ-tons above the dashed white line in the map 922) is significantly suppressed by the growth of moss (γ-tons below the dashed white line in the map 922), especially on the left hand side of the scene where the moss approaches close proximity to the wall. Such competition cannot be readily approximated by individually modeling two weathering effects and blending the results. In the example of FIG. 9, scenes were rendered using multi-texturing as described with respect to FIG. 7 above. For purpose of comparison, FIG. 9D shows maps 940 and 942 for moss growth only.

For the exemplary methods 900 of FIG. 9, two types of γ-tons were used: Ton(rain) for the rain and Ton(moss) for moss seeds. The rain γ-ton motion probabilities were $(k_s, k_p, k_f)=(0.0, 0.8, 0.2)$, whereas the rain γ-ton carrier attributes were dirt $s_{dirt}=0$ and moss $s_{moss}=0$. The moss γ-ton motion probabilities were $(k_s, k_p, k_f)=(0.2, 0.0, 0.0)$, whereas the moss γ-ton carrier attributes were dirt $s_{dirt}=0$ and moss $s_{moss}=0$. For both the cement wall and the ground, their γ-reflectances were $(\Delta_s, \Delta_p, \Delta_f)=(0.0, 0.4, 0.05)$ and their material properties included dirt $(s_{dirt})$ and moss $(s_{moss})$. While the material properties of the cement wall were initialized as $s_{dirt}=0$ and $s_{moss}=0$, the material properties of the ground were initialized as $s_{dirt}=1$ and $s_{moss}=0$. The γ-transport rules for the ground were Surf.$s_{moss}$←Surf.$s_{moss}$+Ton(moss).$s_{moss}$; and
Surf.$s_{moss}$←Surf.$s_{moss}$+0.02·Ton(rain).$s_{moss}$.

The first rule was only used once at the beginning to initialize the ground with small number of moss seeds. The γ-transport rule for the cement wall was Surf.$s_{dirt}$←Surf.$s_{dirt}$+Ton(rain).$s_{dirt}$; and the γ-transport rules for the rain γ-ton was Ton(rain).$s_{moss}$←Ton(rain).$s_{moss}$+0.1·Surf.$s_{moss}$; Ton(rain).$s_{dirt}$←Ton(rain).$s_{dirt}$+Surf.$s_{dirt}$. After each γ-ton tracing iteration an update occurred for the surface properties of the ground as follows: Surf.$s_{dirt}$←Surf.$s_{dirt}$−0.1·Surf.$s_{moss}$.

In various examples described herein properties related to all effects were stored as a single layer of surface elements (e.g., surfels). Such an implementation may help a user to easily specify rules of the interaction between effects and ignore the complex underlying physics details. Such an approach may also allow a user to simulate multiple effects on any surface and to render the effects with various methods. Various exemplary techniques are not limited to a single-layer representation as multiple layers may be used or volume elements (e.g., voxels), etc. Such multi-layer or other representations may be used to simulate, for example, multiple weathering effects with some structural change of objects (e.g., dust accumulated in the cracks of an oil painting).

Figure 10:
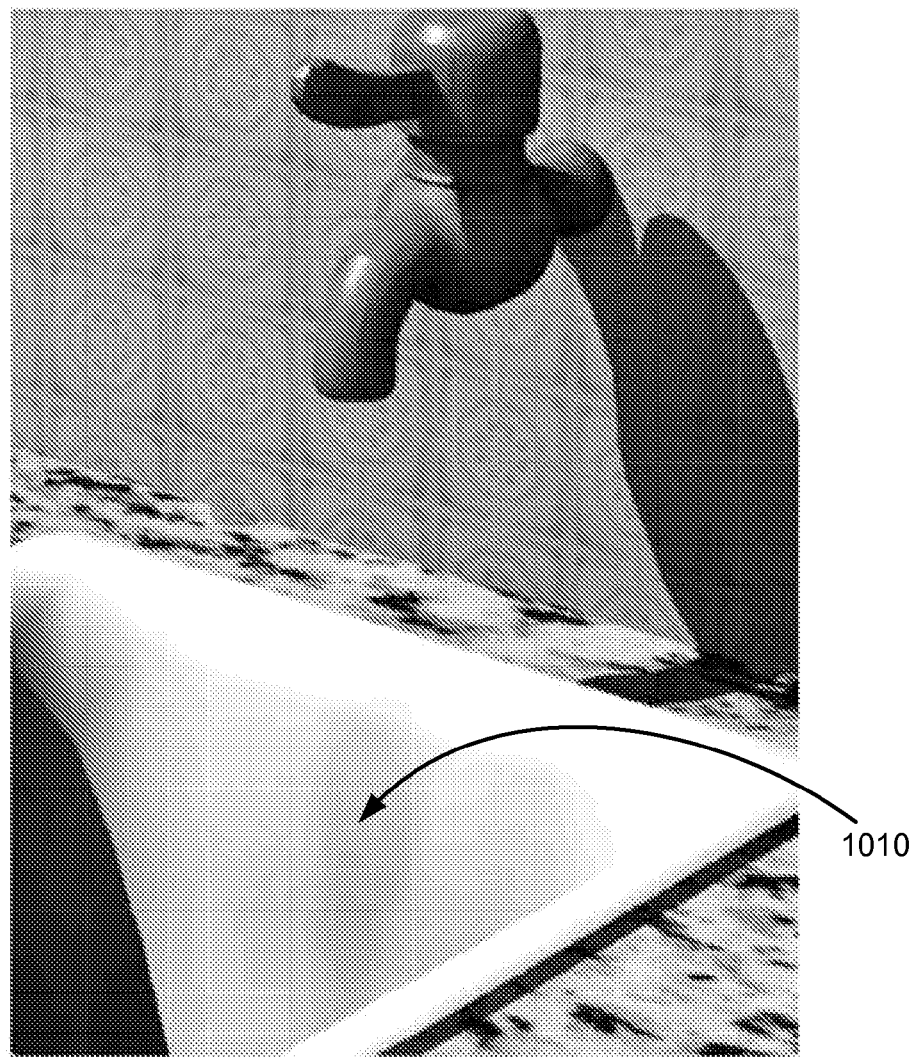
FIG. 10 is an aged scene of a dripping faucet above a sink wherein a simulated stain exists in the sink due to the dripping of the faucet.
Figure 11A:
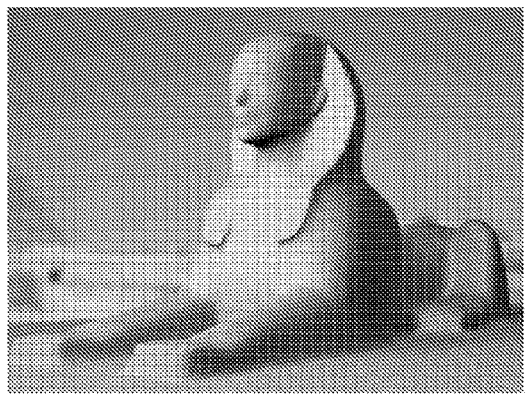
FIG. 11 is a series of scenes according to an exemplary method for altering geometry of an object in a scene using exemplary γ-ton tracing.
Figure 11B:
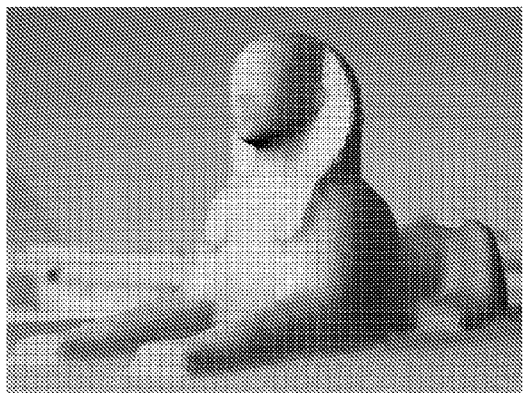
Figure 11C:
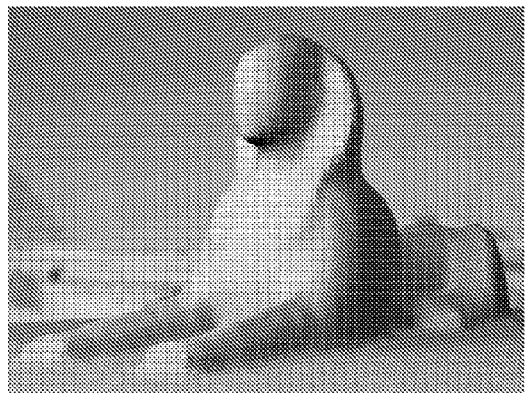
Figure 11D:
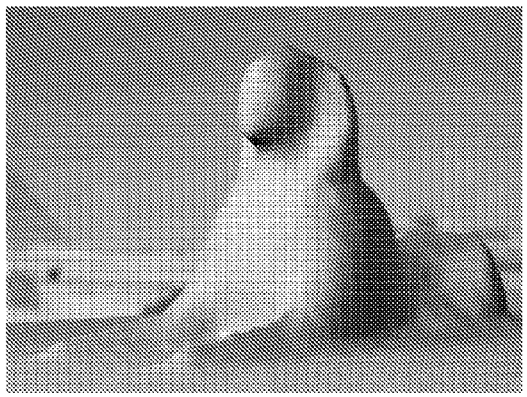

FIG. 10 shows an exemplary rendering 1000 of a scene with a faucet above a sink where a stain 1010 is formed in the sink due to a dripping of the faucet. In such an example, the dripping faucet may be modeled using a point source that emits particles (e.g., γ-tons in a certain direction or range). The example of FIG. 10 serves to demonstrate various aspects of exemplary techniques presented herein.

As already mentioned, geometry changes can be simulated using various exemplary techniques. FIGS. 11A-D shows an example of weathering that involves large-scale geometry change as method 1100. This weathering sequence is generated by displacing vertices of a Sphinx model after each γ-ton tracing iteration. In this example, direct displacement occurs of a vertex based on tracing a large number of γ-tons emitted from a hemispherical environment source.

In such an example, an incident γ-ton can pick up material from a point and deposits the material at one or more points of subsequent surface interactions. Consequently, some points can gain a lot of mass while others loose mass. In the Sphinx example, such information is used to displace points (e.g., typically vertices in a geometric model). In particular, a mass-gaining point displaces along the positive direction of its surface normal and in an amount proportional to the mass gained. On the other hand, a mass-loosing point displaces similarly but along the negative direction of its surface normal. Hence, aging of the Sphinx is simulated.

To facilitate surface displacement, a retiling of the initial surface mesh may occur using, for example, Turk's technique for meshes. The resulting surface mesh is retiled after each iteration to generate a deformed model that can be used for a subsequent round of γ-ton tracing and displacement. Such an exemplary technique is not limited to the example shown in FIGS. 11A-D as it may appropriately apply to various problems where simulation of geometry changes is desired.

Performance of various exemplary methods described herein depends on available resources and types of resources. In general, run time for an exemplary γ-ton propagation will depend mainly on two factors: the number of γ-tons emitted and the number of surfels (or other scene elements). For example, for the Sphinx model shown in FIGS. 11A-D, resampling used 200 k surfels and each iteration took about 3 minutes to trace 10 k γ-tons and to retile the mesh, which contained about 50 k vertices (PC with a 3 GHz PENTIUM IV processor).

Exemplary Computing Environment

The various exemplary technologies may be implemented in different computer environments. For example, various exemplary methods are typically computer-implementable. The computer environment shown in FIG. 12 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 12 illustrates an example of a suitable computing system environment 1200 on which various exemplary methods may be implemented. Various exemplary devices or systems may include any of the features of the exemplary environment 1200. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various exemplary methods, applications, etc., may be described in the general context of computer-executable instructions, such as program modules, being executed by a computer. Such instructions may be stored on one or more computer-readable media. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 12, an exemplary system for implementing the various exemplary methods includes a general purpose computing device in the form of a computer 1210. Components of computer 1210 may include, but are not limited to, a processing unit 1220, a system memory 1230, and a system bus 1221 that couples various system components including the system memory 1230 to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a data media interface such as interface 1240, and magnetic disk drive 1251 and optical disk drive 1255 are typically connected to the system bus 1221. In FIG. 12, the data media interface 1240 is optionally a removable memory interface. For purposes of explanation of the particular example, the magnetic disk drive 1251 and the optical disk drive use the data media interface 1240.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joysticks game pad, satellite dish, scanner, or the like. These and other input devices are often connected to the processing unit 1220 through a user input interface 1260 that is coupled to the system bus 1221, but may be connected by other interface and bus structures, such as a parallel port, game port or a universal serial bus (USB). A monitor 1291 or other type of display device is also connected to the system bus 1221 via an interface, such as a video interface 1290. In addition to the monitor 1291, computers may also include other peripheral output devices such as speakers and printer, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the features described above relative to the computer 1210. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in a remote memory storage device. By way of example, and not limitation, FIG. 12 illustrates remote application programs 1285 as residing on the remote computer 1280 (e.g., in memory of the remote computer 1280). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features disclosed acts are disclosed as exemplary forms of implementing the claimed subject matter.

The invention claimed is:

1. A computer-implementable method comprising:
    providing a computer-generated object wherein the object has characteristics;
    resampling the object to provide a point-based model of the object wherein each point represents a surface element of the object;
    emitting a computer-generated particle;
    determining if the particle interacts with the surface elements of the point-based model of the object;
    if the particle interacts with the surface elements of the point-based model of the object, storing, in, memory, interaction information in a map over the surface elements;
    altering one or more of the characteristic of the object based on the map wherein the altering simulates weathering or aging of the object; and
    rendering, to a display device, the object with the one or more altered characteristics.

2. The computer-implementable method of claim 1 wherein the determining determines motion of the particle based at least in part on one or more motion probabilities associated with the particle.

3. The computer-implementable method of claim 2 wherein the one or more motion probabilities comprise a motion probability for straight line motion.

4. The computer-implementable method of claim 2 wherein the one or more motion probabilities comprise a motion probability selected from a group consisting of a motion probability for straight line motion, a motion probability for parabolic motion and a motion probability for flow substantially along a surface.

5. The computer-implementable method of claim 1 wherein the determining comprises use of a stochastic algorithm.

6. The computer-implementable method of claim 1 wherein the altering alters one or more of the characteristics of the object based at least in part on a carrier attribute associated with the particle.

7. The computer-implementable method of claim 6 wherein the carrier attribute comprises a blemish carrier attribute.

8. The computer-implementable method of claim 1 wherein the altering alters one or more of the characteristics of the object based at least in part on two or more carrier attributes associated with the particle.

9. The computer-implementable method of claim 8 wherein the altering allows for interaction between at least two of the carrier attributes.

10. The computer-implementable method of claim 8 wherein the two or more carrier attributes comprise a water carrier attribute and a water dependent carrier attribute.

11. The computer-implementable method of claim 8 wherein the two or more carrier attributes comprise a wind carrier attribute and a wind dependent carrier attribute.

12. The computer-implementable method of claim 1 wherein the altering alters one or more of the characteristics of the object based at least in part on a deterioration rate associated with motion of the particle.

13. The computer-implementable method of claim 12 wherein the deterioration rate is associated with a particular type of motion.

14. The computer-implementable method of claim 1 wherein the particle interacts at more than one position on the object.

15. The computer-implementable method of claim 1 wherein the particle acts to transport material and thereby alter characteristics of the object or characteristics in a scene in which the object exists.

16. The computer-implementable method of claim 1 further comprising, based at least in part on the emitting, altering one or more characteristics of a scene in which the object exists.

17. One or more computer-readable storage media comprising processor-executable instructions to execute the method of claim 1.

18. A computer-implementable method comprising:
    providing a computer-generated scene;
    resampling the scene to provide at least one point-based model associated with the scene wherein each point represents a surface element in the scene;

tracing a computer-generated particle in the scene with respect to the represented surface elements wherein the particle comprises one or more carrier attributes and one or more motion probabilities to determine motion of the particle in the scene;

storing, in memory, information from the tracing to at least one map over at least some of the surface elements; and rendering the scene, to a display device, based at least in part on the at least one map to simulate weathering or aging of the scene wherein the one or more motion probabilities diminish when the tracing indicates that the particle interacts with an object in the scene.

19. A computer-implementable method comprising:

providing a computer-generated scene;

resampling the scene to provide at least one point-based model in the scene wherein each point represents a surface element in the scene;

tracing a computer-generated particle in the scene with respect to the represented surface elements wherein the particle comprises one or more carrier attributes and one or more motion probabilities to determine motion of the particle in the scene;

storing, in memory, information from the tracing to at least one map over at least some of the surface elements; and rendering the scene, to a display device, based at least in part on the at least one map to simulate a geometric erosion effect of an object in the scene.

* * * * *

UNITED STATES PATENT AND TRADEMARK OFFICE
CERTIFICATE OF CORRECTION

| | | |
|---|---|---|
| PATENT NO. | : 7,557,807 B2 | Page 1 of 1 |
| APPLICATION NO. | : 11/174439 | |
| DATED | : July 7, 2009 | |
| INVENTOR(S) | : Yanyun Chen et al. | |

It is certified that error appears in the above-identified patent and that said Letters Patent is hereby corrected as shown below:

Title page, item (54), under "Title" column 1, line 2, delete "y" and insert -- $\gamma$ --, therefor.

In column 1, line 2, delete "y" and insert -- $\gamma$ --, therefor.

In column 17, line 6, delete "joysticks" and insert -- joystick, --, therefor.

In column 17, line 65, in Claim 1, delete "in," and insert -- in --, therefor.

Signed and Sealed this
Fifteenth Day of February, 2011

David J. Kappos
*Director of the United States Patent and Trademark Office*